US010123087B1

(12) United States Patent
Killick

(10) Patent No.: US 10,123,087 B1
(45) Date of Patent: Nov. 6, 2018

(54) CHANNEL BLOCK SWITCHING

(71) Applicant: Cox Communications, Inc., Atlanta, GA (US)

(72) Inventor: Ray Killick, Alpharetta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/207,314

(22) Filed: Mar. 12, 2014

(51) Int. Cl.
| | |
|---|---|
| *H04N 21/482* | (2011.01) |
| *H04N 21/439* | (2011.01) |
| *H04N 21/2343* | (2011.01) |
| *H04N 21/845* | (2011.01) |
| *H04N 21/23* | (2011.01) |
| *H04N 21/2662* | (2011.01) |

(52) U.S. Cl.
CPC ........... *H04N 21/482* (2013.01); *H04N 21/23* (2013.01); *H04N 21/2343* (2013.01); *H04N 21/23439* (2013.01); *H04N 21/234336* (2013.01); *H04N 21/2662* (2013.01); *H04N 21/4396* (2013.01); *H04N 21/845* (2013.01); *H04N 21/8455* (2013.01); *H04N 21/8456* (2013.01)

(58) Field of Classification Search
CPC ............ H04N 21/23; H04N 21/2343; H04N 21/234336; H04N 21/23439; H04N 21/2662; H04N 21/482; H04N 21/845; H04N 21/8455; H04N 21/8456
USPC ..................... 725/37–61, 114–115
See application file for complete search history.

(56) References Cited

U.S. PATENT DOCUMENTS

| 5,327,176 | A | * | 7/1994 | Forler et al. ................. 348/564 |
|---|---|---|---|---|
| 9,003,445 | B1 | * | 4/2015 | Rowe ............... H04N 21/26283 725/37 |
| 2002/0067376 | A1 | * | 6/2002 | Martin ............... H04N 21/8547 715/810 |
| 2004/0019901 | A1 | * | 1/2004 | Spio .............................. 725/25 |
| 2007/0162953 | A1 | * | 7/2007 | Bolliger ........... G06F 17/30056 725/142 |
| 2007/0204302 | A1 | * | 8/2007 | Calzone ........................ 725/46 |
| 2008/0092169 | A1 | * | 4/2008 | Shannon ............ H04N 21/4532 725/46 |
| 2009/0322962 | A1 | * | 12/2009 | Weeks ......................... 348/726 |
| 2010/0153999 | A1 | * | 6/2010 | Yates ................. H04N 21/4532 725/39 |
| 2013/0061266 | A1 | * | 3/2013 | Chai ................. H04N 21/4314 725/41 |
| 2013/0173796 | A1 | * | 7/2013 | Grab et al. .................... 709/225 |

(Continued)

*Primary Examiner* — Jeremy S Duffield
(74) *Attorney, Agent, or Firm* — Merchant & Gould

(57) ABSTRACT

A channel block switching system enables a viewer to browse linear channels by switching through blocks of channels as a group instead of switching one channel at a time. Each channel block is displayed as an arrangement of channel windows. Each channel window displays the linear video content of one of the channels in the channel block allowing the viewer to select a channel to watch based on the linear visual content rather than from a static image or a description of the content. The channel block switching system enables display of the channel block using the lowest available resolution. The channel block switching system allows the viewer to listen to the audio content of any channel in the channel block being displayed with the audio for the remaining channels being muted and, optionally, displaying closed captioning.

20 Claims, 10 Drawing Sheets

(56) References Cited

U.S. PATENT DOCUMENTS

2014/0026052 A1\* 1/2014 Thorwirth ................. G06F 3/01
                                                                  715/721
2014/0082661 A1\* 3/2014 Krahnstoever et al. ........ 725/32
2014/0223502 A1\* 8/2014 Doblmaier et al. ............ 725/93

\* cited by examiner

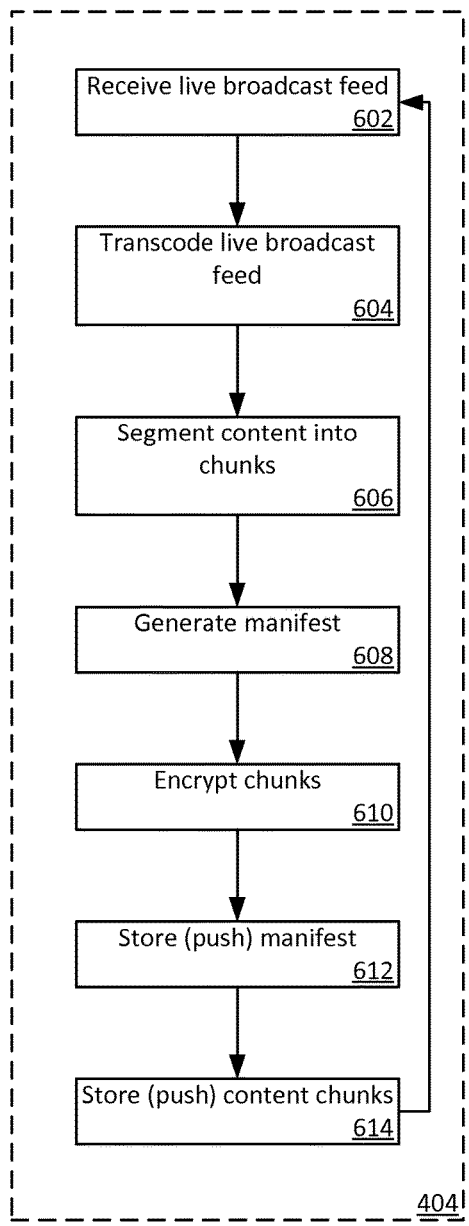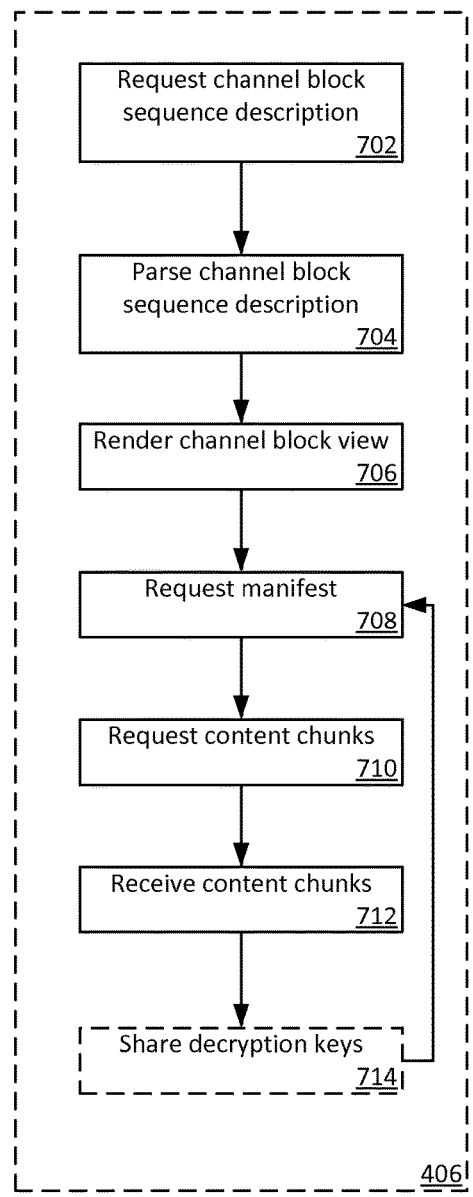
Fig. 6
Fig. 7

CHANNEL BLOCK SWITCHING

BACKGROUND

Cable and satellite television operators are able to offer large number of linear channels to subscribers. Currently, one way for viewers to select a channel to watch is to sample linear program content by cycling through the channels one at a time. Channel cycling gives the viewer the opportunity to select a channel based on the audiovisual appeal of the linear program content, but has its drawbacks. Cycling through linear channels takes increasingly longer as the number of channels grows. Further, at the time any given channel is reached, the channel may be showing something other than the linear program content, such as a commercial or a breaking news report, which requires the viewer to continue without seeing the regularly scheduled program content for that channel or wait until the linear program content resumes.

Another way to select a channel to watch is to scroll through program content descriptions in a channel guide. Instead of individual channels, most channel guides present the viewer with program content descriptions for multiple channels and, often, multiple time slots. The tradeoff is that channel guides convert the audiovisual experience of the linear program content into an intellectual exercise dependent upon very brief written summaries of linear program content.

A recent introduction is topic-oriented "mosaic" channels that combine links to several different television channels. The links are static thumbnail images (e.g., a still photograph or a network icon). The viewer can cycle through the links and go directly to the channel using the link. The mosaic channel may play the audio for the selected channel but offers the viewer no information about the linear program content on the unselected channels in the mosaic.

BRIEF SUMMARY

Various embodiments of a channel block switching system enable a viewer to browse linear channels by switching through blocks of channels as a group instead of switching one channel at a time. Each channel block is displayed as an arrangement of channel windows. Each channel window displays the linear video content of one of the channels in the channel block allowing the viewer to select a channel to watch based on the linear visual content rather than from a static image or a description of the content. The channel block switching system enables display of the channel block using the lowest available resolution. The channel block switching system allows the viewer to listen to the audio content of any channel in the channel block being displayed with the audio for the remaining channels being muted and, optionally, displaying closed captioning.

The channel block switching system receives channels from various content sources. A transcoder generates different profiles (i.e., versions) of the programming at different resolutions and/or bitrates, including one or more low resolution/bitrate and one or more higher resolutions/bitrates. A packager fragments the profiles into chunks. The packager generates a manifest for each chunk and may optionally encrypt the chunks. The chunks and the corresponding manifests are packaged and pushed to a content store where they are stored for distribution via a content delivery network.

A configuration service stores channel block sequence descriptions that describe the content, arrangement, and appearance, and/or sequencing of individual channel blocks. The configuration service may store channel block sequence descriptions in a repository (e.g., a configuration database). A client application requests a channel block sequence description from the configuration service. The client application parses the channel block sequence description returned by the configuration service and requests the corresponding channel manifests from the manifest service for each channel in the current channel block. Using the manifests returned by the manifest service, the client application requests the chunks from a suitable channel block profile for each channel in the channel block. As the viewer switches between channel blocks, the client application requests the corresponding manifests for the new current channel block and processing repeats as described above.

BRIEF DESCRIPTION OF THE DRAWINGS

Further features, aspects, and advantages of the invention represented by the embodiments described present disclosure will become better understood by reference to the following detailed description, appended claims, and accompanying figures, wherein elements are not to scale so as to more clearly show the details, wherein like reference numbers indicate like elements throughout the several views, and wherein:

FIG. 6 is a high-level flowchart showing one embodiment of the linear content preparation operation;

FIG. 7 is a high-level flowchart showing one embodiment of the channel block view operation;

DETAILED DESCRIPTION

A channel block switching system is described herein and illustrated in the accompanying figures. The channel block switching system enables a viewer to browse linear channels by switching through blocks of channels as a group instead of switching one channel at a time. Each channel block is displayed as an arrangement of channel windows. Each channel window displays the linear video content of one of the channels in the channel block allowing the viewer to select a channel to watch based on the linear visual content rather than from a static image or a description of the content. The channel block switching system enables display of the channel block using the lowest available resolution to conserve bandwidth. The channel block switching system allows the viewer to listen to the audio content of any channel in the channel block being displayed with the audio for the remaining channels being muted and, optionally, displaying closed captioning.

Figure 1A:
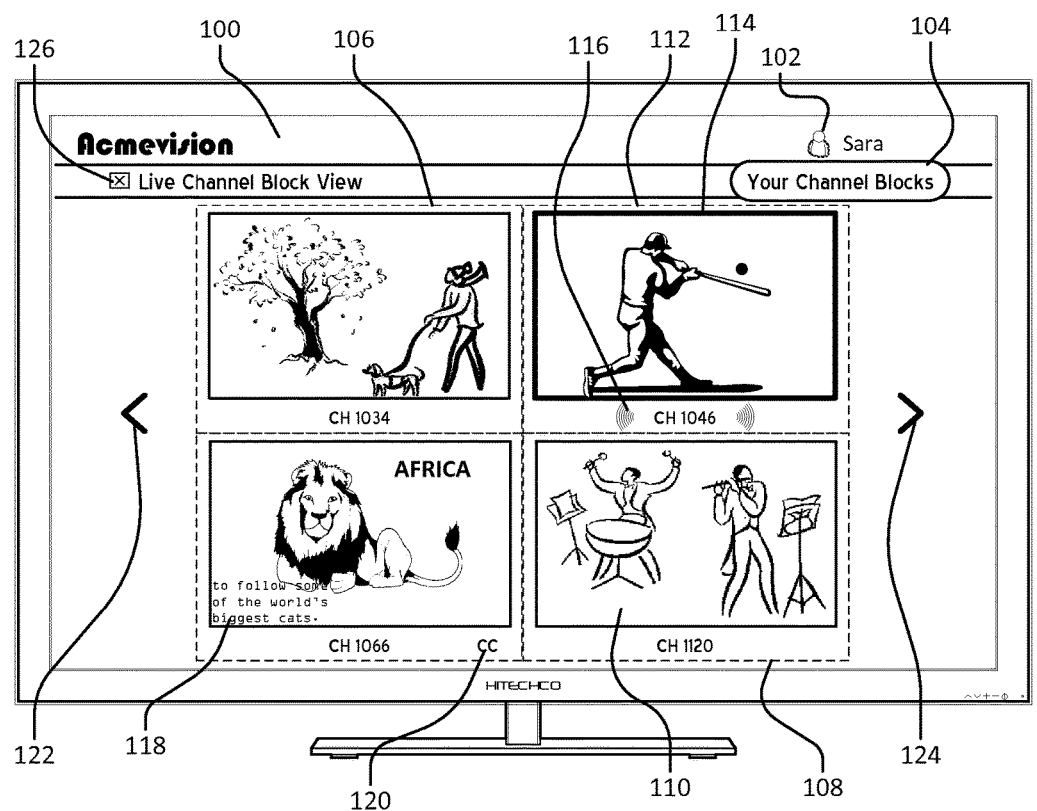
FIG. 1A illustrates one embodiment of the channel block view provided by the user interface of the client application.

FIG. 1A illustrates one embodiment of the channel block view provided by the user interface of the client application. The top portion of the user interface 100 includes configuration components. A user profile selector 102 shows the user profile selected by the current viewer (e.g., Sara) and, optionally, provides functionality allowing the user profile to be changed. A channel block sequence selector 104 shows the currently selected channel block sequence and, optionally, provides functionality allowing the channel block sequence to be changed. In the illustrated embodiment, the channel block sequence is a viewer-configured channel block sequence.

Below the configuration components, the user interface includes the channel block grid 106 with a number of individually addressable cells 108 for displaying separate channels. In various embodiments, the channel block grid is a hypertext markup language 5 (HTML5) grid, a table, or a matrix of windows, frames, inline frames, or similar structures. For purposes of description, the channel block grid is shown in phantom using broken lines; however, the actual grid lines need not be visible. The number of cells in the channel block grid may vary depending factors such as, but not limited to, the size of the program content display for the individual channels, the available bandwidth, and the size of the display showing the channel block view. In the illustrated embodiment, the channel block grid includes four cells arranged in a two-by-two matrix (i.e., two rows of two columns). Each cell in the channel block grid may be substantially the same size or may be independently configured with different sizes. Further, the numbers of sizes of cells in the channel block may vary from channel block to channel block.

A separate channel 110 is rendered in each cell of the channel block grid; however, only one cell may be active (i.e., selected) at a time. The active cell 112 (here, the top right cell) may be identified by an indicator 114, such as, but not limited to, a border or highlighting. While the channel block allows multiple video feeds to be simultaneously displayed, only one audio feed can be played. Accordingly, the channel block view plays the audio feed associated with the channel in the active cell. The audio feeds associated with the channels in the other cells are muted. In various embodiments, an audio indicator 116 may show which channel is providing the active audio feed.

Although only one audio feed may be active, the channel block view may show closed captioning for one or more of the remaining channels in the channel block. In the illustrated embodiment, closed captioning is active for the channel displayed in the bottom left cell of the channel block grid. The closed captioning text 118 appears as normal in the video feed, and the user interface may show a closed captioning indicator 120 to show that closed captioning is active for the channel.

The viewer may switch to another channel block in the channel block sequence. Channel block switching may be accomplished using channel block switching controls, such as a forward control 122 and a back control 124, provided by the user interface. A channel block/channel cycling control 126 allows the viewer to switch between sampling channels using the channel block view and traditional channel cycling. Channel block switching may also be accomplished using gestures recognized by a secondary input device. For example, the user may make swiping gestures on a touch screen of a remote control device or recognized by a video input device (i.e., a camera) in communication with the client application. In various embodiments, the viewer may switch to the channel block immediately preceding or subsequent channel block in the sequence. In some embodiments, the viewer may jump to any other channel block in the sequence using a suitable navigation control.

The viewer may use a gesture (e.g., pressing an enter key on remote) to watch the channel associated with the active cell. When an active cell is selected, the user interface tunes to the selected channel and returns to a regular viewing display.

Figure 1B:
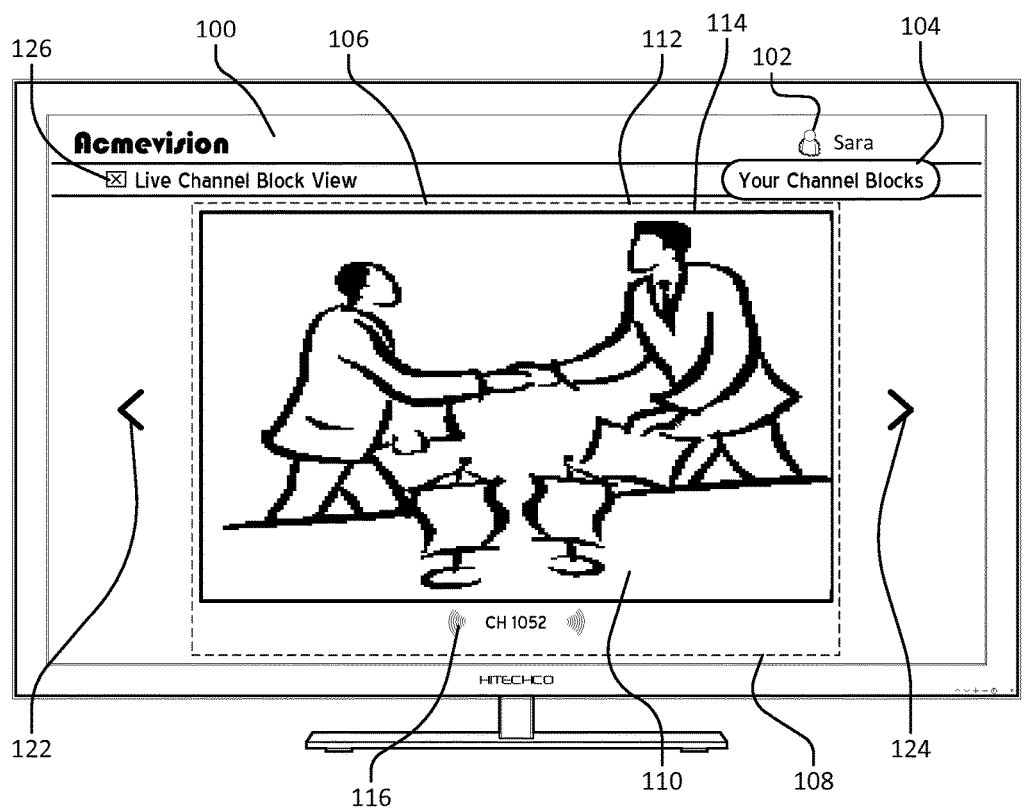
FIG. 1B illustrates an alternate embodiment of the channel block view provided by the user interface of the client application.

FIG. 1B illustrates an alternate embodiment of the channel block view provided by the user interface of the client application. In the illustrated embodiment, the channel block contains a single cell emulating individual channel switching.

Figure 2:
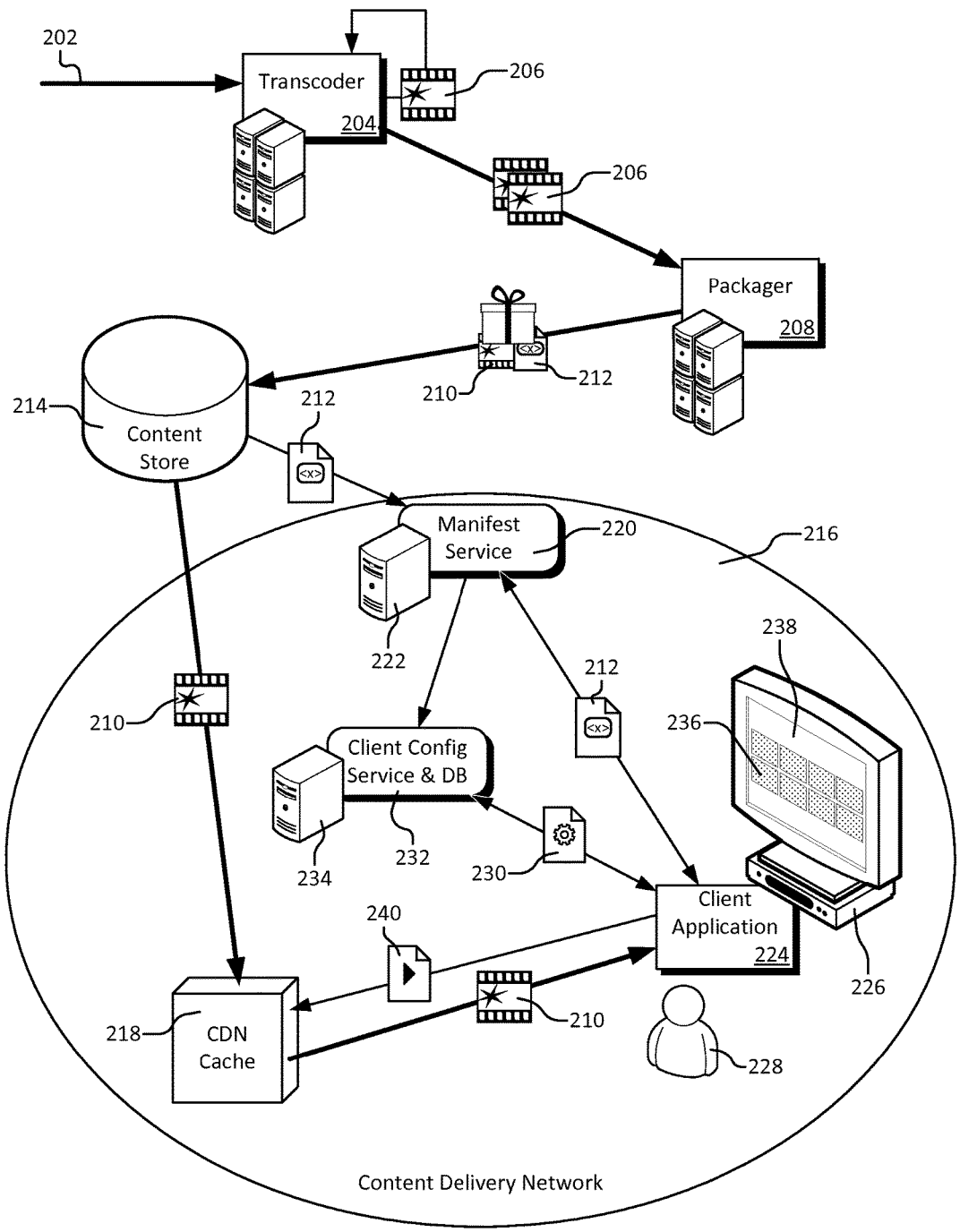
FIG. 2 illustrates one embodiment of the channel block switching system within a service provider network.

FIG. 2 illustrates one embodiment of the channel block switching system 200 within a service provider network. A service provider receives channels (e.g., a broadcast feed) 202 from various content sources (e.g., television networks and stations). The channels are ultimately aggregated and redistributed to viewers (e.g., subscribers or end users). Examples of service providers include providers of programming, such as, but not limited to, multiple system operators, cable system operators, direct-to-home (DTH) or direct broadcast satellite (DBS) operators (i.e., satellite system operators), terrestrial (i.e., over-the-air) broadcast system operators (e.g., networks and stations), internet protocol television (IPTV) system operators, and Internet television system operators, and internet service providers. As used herein, a channel broadly encompasses any individually selectable signal or data stream carrying audiovisual content (i.e., programming) to viewers, regardless of the format or manner in which it is distributed and the type of operator or system distributing it.

Channels may carry linear or on-demand programming. As used herein, the term "linear" refers to the delivery of substantially continuous broadcast or stream of programming or other audiovisual content on a substantially fixed schedule. In other words, the viewer has little to no control over the content, other than to change channels, activating trick play (e.g., fast forward, rewind), or similar features. On-demand programming has no set delivery schedule, but, instead, is delivered when actively requested by the viewer.

A transcoder 204 generates different profiles (i.e., versions) 206 of the programming at different resolutions and/or bitrates (e.g., transizing and/or transrating), including one or more low resolution/bitrate and one or more higher resolutions/bitrates. In various embodiments, the transcoder may also transcode (i.e., change the encoding format) or otherwise manipulate the profiles for compatibility or other reasons. At least one of the lower resolution/bitrate profiles is generated at a resolution and/or bitrate suitable for use when displaying a channel block (i.e., channel block profiles). In various embodiments, the channel block profiles are the lowest resolution/bitrate profiles generated for the programming. In some embodiments, different channel block profiles are generated for use with different size cells in the channel block grid.

Higher resolution/bitrate profiles intended for use when displaying an individual channel are referred to as viewing profiles. In some cases, a channel block profile may require the same resolution and bitrate as a viewing profile. This may occur where lower resolution/bitrate viewing profiles are generated to adapt the programming for display on a particular class of devices (e.g., mobile phones and other small form factor devices or devices with small video display screens) or for adaptive bitrate streaming. In such cases, a single profile may be used for each such purpose.

A packager 208 fragments the profiles into chunks 210. The packager generates a manifest 212 for each profile and may optionally encrypt the chunks. The manifest file may include, but is not limited to, index files and/or playlists. The chunks and the corresponding manifests are packaged and pushed to a content store 214 where they are stored for distribution via a content delivery network 216. It should be appreciated that the channel block switching system is operating on linear broadcast rather than video on demand content or other static content. With video on demand, a manifest for the full content file is generated ahead of time and is pulled onto the content delivery network when the video on demand content is requested. For linear broadcast, the channel block switching system is continuously packaging the content, generating (or updating) the profile manifest, and pushing the content and manifests to the content delivery network in real time, a few chunks at a time.

The content delivery network is illustrative of a distribution network which may include a distributed system of servers and content repositories (e.g., databases) for distributing audio and video content, text, graphics, media files, software applications and associated documents, on-demand content, social media content, linear streaming media content, and the like from the service provider to subscribers. Content delivery networks typically function by providing the requested content from the content store or other content source to the client. As the linear broadcast content is processed, the channel block switching system pushes the packaged content and manifests to the content delivery network. In various embodiments, the content delivery network may include caches that hold copies of recently delivered content to improve response times. Content delivery network servers may be strategically located at the edges of various networks to limit loads on network interconnects and backbones. Content delivery network servers may be redundantly deployed and interact with other content delivery network servers to respond to content requests from clients in attempts to optimize content delivery. In the illustrated embodiment, the content store pushes the chunks to the content delivery network cache 218 and the manifests to a manifest service 220 running on a server 222 operating in the content delivery network.

A client application 224 running on a client device 226 interfaces with the various components of the content delivery network to allow configuration and/or display of channel blocks for browsing and selecting program content to watch. The client device is generally any device or a combination of devices used to receive and display audiovisual content (i.e., program content). Examples of suitable devices that may make up the client device include, but are not limited to, a mobile computing device (e.g., a smart phone or tablet), a general computing device (e.g., a desktop or laptop computer), and a specialized device (e.g., a television, a cable card, or set-top box), and combinations thereof. In the illustrated embodiment, the client device is represented by a set-top box and a television. In various embodiments, one or more of the devices making up the client device are internet protocol (IP) addressable.

The client application may allow a viewer 228 to configure and store channel block sequence descriptions 230 with a configuration service 232 running on a server 234 operating in the content delivery network. The channel block sequence descriptions specify the content, arrangement, and appearance, and/or sequencing of individual channel blocks. More specifically, channel block sequence descriptions may include, but are not limited to, information such as the number of the channels in the channel block, the channels to show in the channel block, the order of the channels in the channel block, and the order of the configured channel block relative to other channel blocks configured by the viewer. The channel blocks configured by the viewer form a channel block sequence. In various embodiments, the service provider provides one or more pre-configured channel block sequences. For example, the service provider may pre-configure channel block sequences such as all channels offered by the service provider and themed channel blocks (e.g., sports, news, or movie channel blocks).

The configuration service may store channel block sequence descriptions in a repository (e.g., a configuration database). In addition to storing viewer-configured channel blocks, the configuration service may store and host default channel block sequence descriptions configured by the service provider and, optionally, shared channel block sequence descriptions authored by other viewers. Each channel block sequence description may be a single file containing descriptions of multiple channel blocks along with sequencing information for moving between channel blocks or multiple files each containing a description of a single channel block along with sequencing information linking to other files making up the channel block sequence description.

In addition to facilitating configuration of channel block sequences, the client application gathers the information needed for the channel block from the content delivery network and renders the channel block view 236 on a display screen 238 (e.g., on a television set). To display a channel block sequence, the client application requests a channel block sequence description from the configuration service. The client application parses the channel block sequence description returned by the configuration service and begins making a stream of requests for the corresponding channel manifests from the manifest service for each channel in the current channel block to keep the cells of the channel block view updated. Using the manifests returned by the manifest service, the client application makes a request 240 for the chunks for each channel in the channel block. The chunks returned to the client application by the content delivery network cache are from an available channel block profile (i.e., a low resolution/bitrate profile). In various embodiments, the chunks returned are from the channel block profile with the lowest resolution/bitrate. When the viewer switches to another channel block, the client application requests the corresponding manifests for the new current channel block and processing repeats as described above. If the viewer selects a channel from the block, the client device is tuned to the selected channel and a suitable viewing profile for the channel is displayed.

Figure 3:
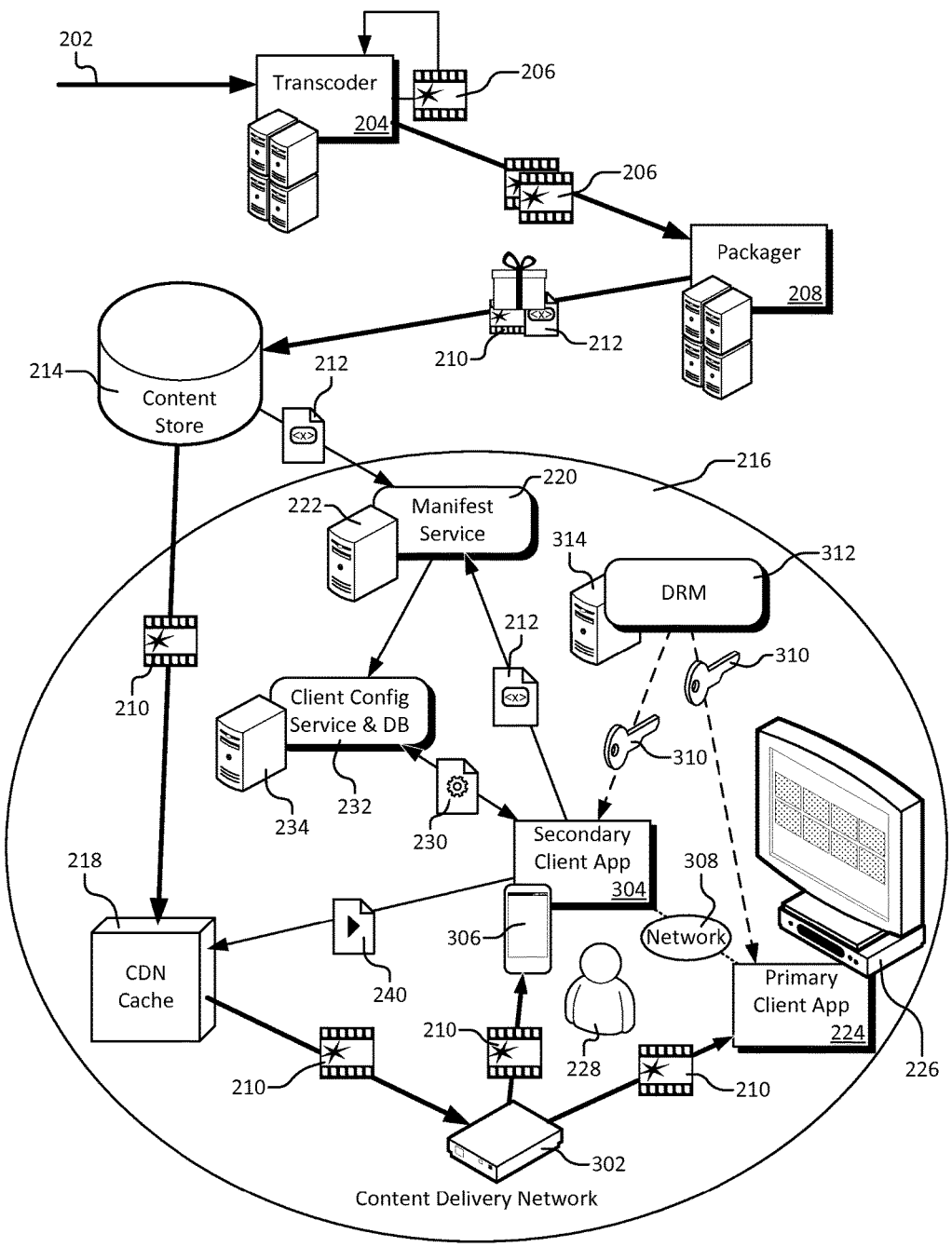
FIG. 3 illustrates one embodiment of the channel block switching system in a multicast environment.

FIG. 3 illustrates one embodiment of the channel block switching system in a multicast environment. Content including the manifests and the chunks are prepared previously described. The multicast environment includes two or more client devices in communication with a gateway 302 (e.g., a modem). The gateway operates as an interface between the client devices and the content delivery network. Content received by the gateway may be multicast (i.e., distributed) to any or all of the connected client devices.

In the multicast environment, the channel block switching system allows a secondary client application 304 running on a secondary client device 306 to control program content delivery to the primary client device. The secondary client device is typically a personal device that may be used as a channel block switching remote control, such as a smart phone or tablet, while the primary client device typically includes a larger video display (e.g., a television) and an IP-addressable receiver/tuner (e.g., a IP set-top box). When multicast channel block switching is initiated, the secondary client application requests the channel block sequence description from the configuration service. The secondary client application parses the channel block sequence description returned by the configuration service and requests the corresponding channel manifests from the manifest service for each channel in the current channel block. Using the manifests returned by the manifest service, the secondary client application requests the chunks from the channel block profiles for each channel in the channel block.

The chunks returned to the gateway by the content delivery network cache are from the channel block profile with the lowest resolution/bitrate applicable to the secondary client device. The gateway delivers the chunks to the primary client device and the secondary client device. As the viewer navigates through the channel block sequence on the secondary client device, the same channel block is displayed on both the primary client device and the secondary client device. Multicasting the chunks from the channel block profile for the secondary client device enables channel surfing on the larger screen while conserving bandwidth.

The chunks may be encrypted, and the encryption used for devices of the secondary client device/application type may differ from the encryption used for devices of the primary client device/application type. For example, content intended for IP-based distribution to mobile devices may be encrypted differently than content distributed to a set-top box over a cable network. In such cases, the secondary client application provides the primary client application with information that will allow decryption of the chunks. In various embodiments, the secondary client application makes a connection to the primary client application over a network 308 (e.g., a local area or personal area network) to provide information needed to request a decryption key 310 from a digital rights management service 312 running on a computing device 314. Alternatively, the secondary client application may provide the decryption key to the primary client application.

Figure 4:
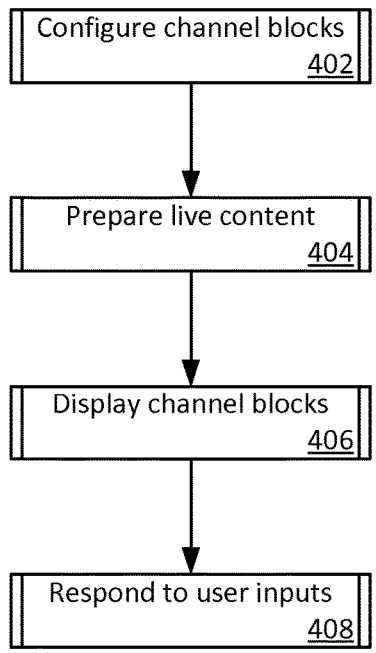
FIG. 4 is a high-level flowchart showing one embodiment of the method for channel block switching.

FIG. 4 is a high-level flowchart showing one embodiment of the method for channel block switching. The channel block switching method 400 includes four main operations: A configuration operation 402, a linear content preparation operation 404, a channel block view operation 406, and a user interaction operation 408. Each of the main operations is described hereinafter.

Figure 5:
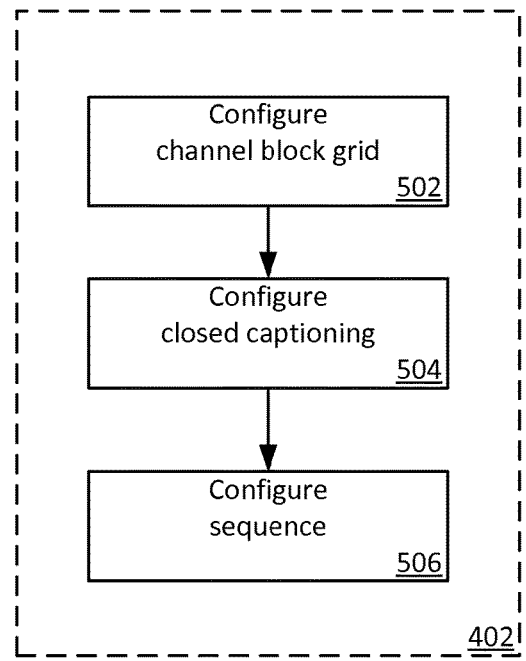
FIG. 5 is a high-level flowchart showing one embodiment of the configuration operation.

FIG. 5 is a high-level flowchart showing one embodiment of the configuration operation 402. The configuration operation configures individual channel blocks and channel block sequences. A configure channel block operation 502 sets the arrangement of the channel block grid including parameters such as the number of cells in the channel block grid and the channel associated with each cell. In various embodiments, a channel not affirmatively assigned to a cell may be handled according to a default configuration rule. For example, the unassigned channel may be omitted from the channel block sequence, displayed individually in numeric order, or grouped with other unassigned channels in automatically generated channel blocks. In some embodiments, the individually displayed unassigned channels and automatically generated channel blocks may be placed in the channel block sequence after all affirmatively configured channel blocks, in numeric order, or some other standard position.

For example, an unassigned channel may be displayed in a single cell channel block or the channel block switching system may revert to single channel cycling until another channel block is reached. In other words, some embodiments of the channel block switching system may automatically switch between displaying channel blocks and individual channels as needed.

A closed captioning configuration operation 504 sets whether the closed captioning is displayed for the channels in the channel block when they are not selected (i.e., the audio for that channel is not active). The use of closed captioning for unselected channels may be configured globally at the channel block level. In other words, closed captioning may be turned on or off by default for all channels. In some embodiments, the use of closed captioning may be configured for individual channels. Configuration at the individual channel level may optionally override a global configuration.

A sequence configuration operation 506 sets relative order of the channel blocks and, optionally, unassigned channels that are grouped into a single channel block sequence. The relative order determines the next channel block (or individual channel) that is displayed when navigating, either forward or backward, through a channel block sequence.

The configuration operation may be performed at the viewer level or at the service provider level. Viewer level configurations may be private, shared with restrictions, or public. For example, a viewer-created configuration may be available only to the viewer, shareable with other viewers by invitation, shareable with other viewers linked to the same subscriber account, or publicly shared with other viewers. Service level configurations are typical default configurations publicly shared with all viewers. In general, the configuration operation is the same regardless of whether performed at the viewer level or the service provider level.

FIG. 6 is a high-level flowchart showing one embodiment of the linear content preparation operation 404. A linear channel receipt operation 602 receives channels carrying programming from programming source(s). A transcoding operation 604 generates one or more profiles including at least one low resolution/bitrate profile suitable for use when displaying a channel block (i.e., channel block profiles) and one or more profiles at higher resolutions/bitrates suitable for use when displaying a single channel for viewing. In various embodiments, the channel block profile is the profile with the lowest resolution/bitrate generated for the linear channel.

A segmentation operation 606 segments the profiles into chunks. A manifest generation operation 608 generates the manifest for each chunk. An optional encryption operation 610 encrypts the chunks so that the content may only be viewed on devices associated with authorized subscribers who have access to the necessary decryption keys. A manifest storage operation 612 sends the manifests to a manifest service that makes the manifests available to client devices. A content caching operation 614 sends the chunks to content delivery cache nodes that make the chunks available to client devices. As previous noted, the sub-operations of the linear content preparation operation are continuously performed on the linear broadcast content received by the channel block switching system.

FIG. 7 is a high-level flowchart showing one embodiment of the channel block view operation 406. A channel block sequence request operation 702 obtains the channel block sequence description for use in displaying the channel block view. The channel block sequence description may be obtained from the configuration service or any other available repository for channel block sequence descriptions. A channel block sequence parsing operation 704 parses the channel block sequence description to determine the layout, the included channels, and other configuration information for the current channel block to be displayed in the current channel block. A channel block view generation operation 706 renders the user interface for the channel block view including the channel block grid, navigation controls, and other elements of the channel block view.

A manifest request operation 708 obtains the manifests corresponding to the channels in the current channel block from the manifest service. In some embodiments, the client application requests the individual channel manifests for each of the channels in the current channel block from the manifest service. In some embodiments, the client application requests a block manifest for the current channel block. The block manifest is a compilation of the individual manifest files comprising each channel in the channel block. The block manifest includes a section for each individual channel manifest that the client application needs to parse to display the programming each channel included in the channel block. In various embodiments, the manifests and/or the channel block sequence descriptions are formatted using a markup language, such as, but not limited to, extensible markup language (XML), allowing a single document to contain more than one section (e.g., multiple channel manifests or channel block descriptions).

Once the manifests have been returned, a chunk request operation 710 requests the chunks specified in the manifests for use in the channel block view. In a render chunk operation 712, the client application renders the received chunks in the corresponding cells of the channel block grid.

In multicast scenarios, the channel block view operation includes a key exchange operation 714 in which the client application may provide the rendering application with sufficient information to request decryption keys from the digital rights management server or provide the appropriate decryption keys directly to the rendering application. The channel block view operation continues to request the manifests, content chunks, and decryption keys (if they change) while the channel block view is being displayed.

Figure 8:
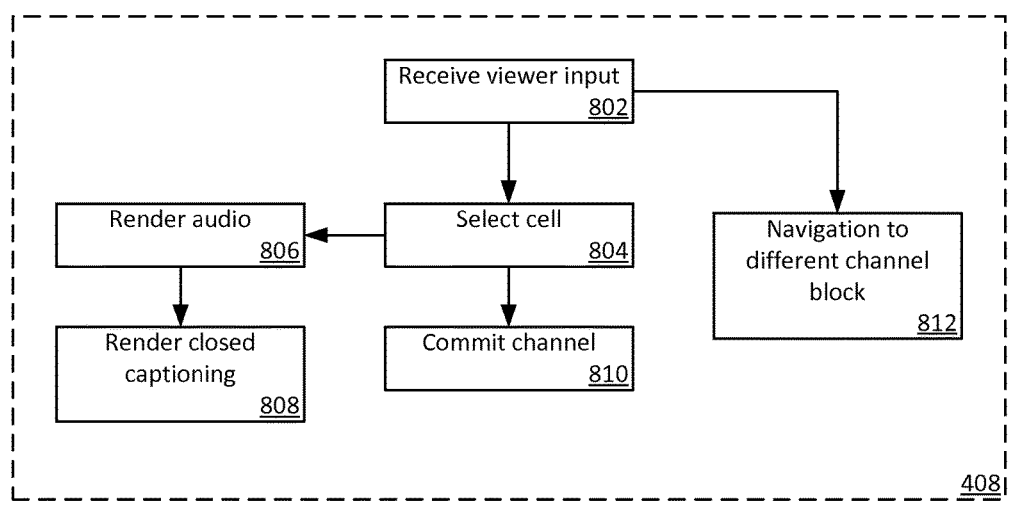
FIG. 8 is a high-level flowchart showing one embodiment of the channel block interaction operation.

FIG. 8 is a high-level flowchart showing one embodiment of the channel block interaction operation 408. A user interaction operation 802 receives inputs from the viewer for interacting with the channel block view. A selection operation 804 receives a selection of one of the cells in the channel block grid as the active cell. An audio output operation 806 renders the audio for the channel associated with the active cell for playback through the audio output device (e.g., television speakers or a surround sound system). The audio output operation also mutes the audio on the other channels displayed in the current channel block. A closed captioning output operation 808 renders the closed captioning for each channel in the current channel block configured to use closed captioning. In addition to the rendered audio, closed captioning may optionally be displayed for the channel associated with the active cell. A commit operation 810 reverts to the individual display of the selected channel at a suitable higher resolution/bitrate profile. In other words, the commit operation set the tuner of an equipped device (e.g., a television set, cable card, or set-top box) to the channel associated with the selected cell when the selection has been committed. A channel block navigation operation 812 switches to the next or previous channel block or channel within the channel block sequence.

Channel block switching offers greater benefit when displaying channel blocks including linear channels, it is not necessary that channel blocks exclusively display linear channels. Embodiments of the channel block switching system may be used with on-demand programming. For example, as an alternative to a list of available on-demand programs, channel blocks may be displayed with on-demand program trailers or the actual on-demand programs being played as if the trailer or on-demand program was a linear channel.

Figure 9:
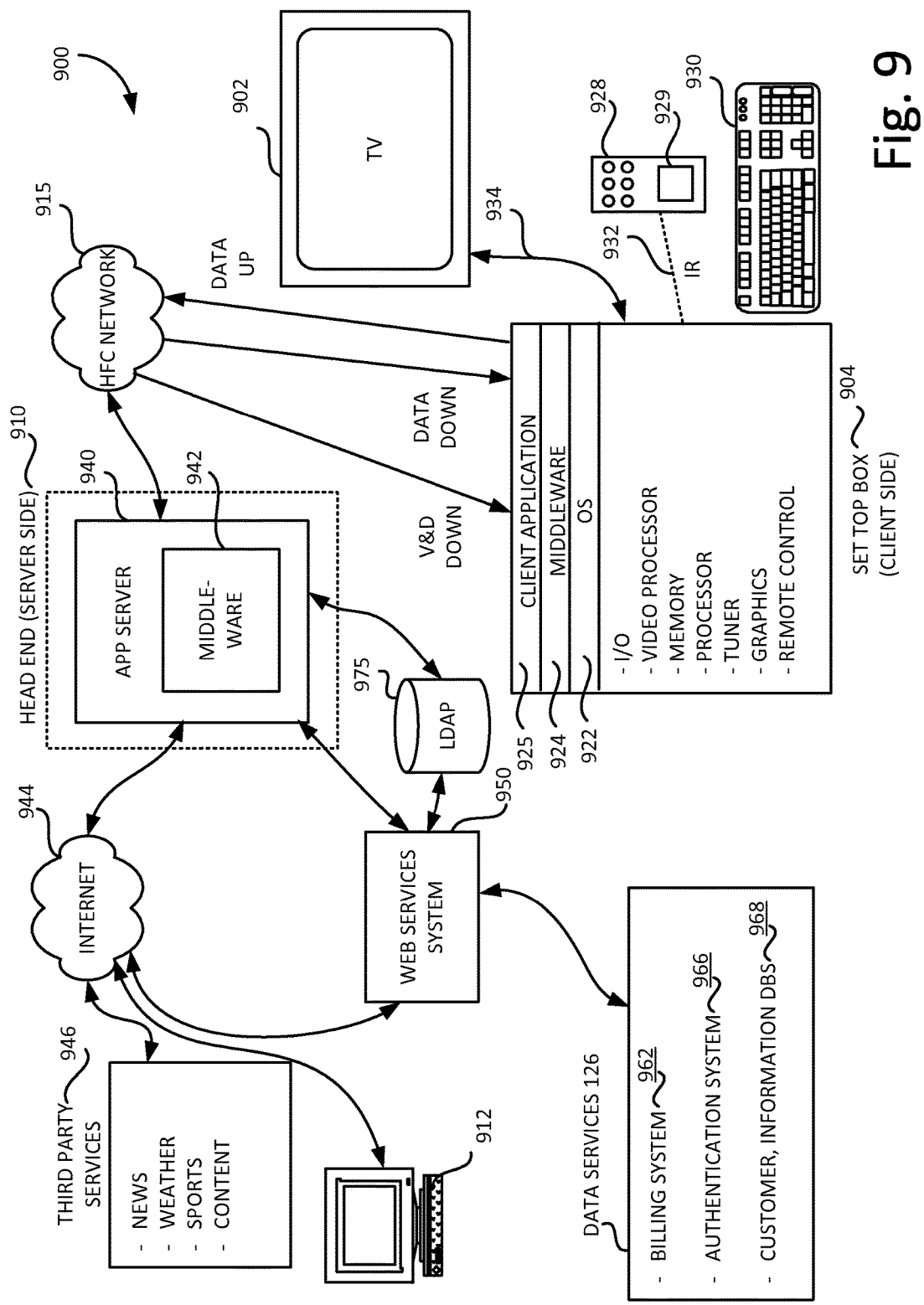
FIG. 9 is a simplified block diagram illustrating a cable television services system.

FIG. 9 is a simplified block diagram illustrating one embodiment of a cable television services system 900 (hereafter referred to as "CATV") for providing channel block switching functionality. As should be appreciated, a CATV services system 900 is but one of various types of systems that may be utilized for providing an operating environment for providing functionality described herein. Digital and analog video programming, information content, and interactive television services are provided via a hybrid fiber-coax (HFC) network 915 to a television set 902 for consumption by a cable television/services system customer. As is known to those skilled in the art, HFC networks 915 combine both optical fiber and coaxial cable lines. Typically, optical fiber runs from the cable headend 910 to neighborhoods of subscribers. Coaxial cable runs from the optical fiber feeders to each customer or subscriber. The functionality of the HFC network 915 allows for efficient bidirectional data flow between the client-side set-top box 904 and the server-side application server 940 of the embodiment.

The CATV system 900 is in the form of a distributed client-server computing system for providing video and data flow across the HFC network 915 between server-side services providers (e.g., cable television/services providers) via a server-side headend 910 and a client-side customer via a client-side set-top box 904 functionally connected to a customer receiving device, such as the television set 902. As is understood by those skilled in the art, modern CATV systems 900 may provide a variety of services across the HFC network 915 including traditional digital and analog video programming, telephone services, high speed Internet access, video-on-demand, and information services.

On the client side of the CATV system 900, digital and analog video programming and digital and analog data are provided to the customer television set 902 via the set-top box 904. Interactive television services that allow a customer to input data to the CATV system 900 likewise are provided by the set-top box 904. In the illustrated embodiment, the set-top box 904 is a multipurpose computing device having a computer processor, memory, and an input/output mechanism. The input/output mechanism receives input from server-side processes via the HFC network 915 and from customers via input devices such as the remote control device 928, keyboard 930, or other computing device 912, such as a smart phone, a personal computer (e.g., a laptop or desktop), a smart television, a set-top box, a tablet/slate computer, etc. The remote control device 928 and the keyboard 930 may communicate with the television 902 or the set-top box 904 via a suitable communication transport such as the infrared connection 932. The remote control device 928 may include a biometric input module 929. The set-top box 904 also includes a video processor for processing and providing digital and analog video signaling to the television set 902 via a cable communication transport 934. A multi-channel tuner is provided for processing video and data to and from the set-top box 904 and the server-side headend system 910, described below.

The set-top box 904 also includes an operating system 922 for directing the functions of the set-top box 904 in conjunction with a variety of client applications 925. For example, if a client application 925 requires a news flash from a third-party news source to be displayed on the television set 902, the operating system 922 may cause the graphics functionality and video processor of the set-top box 904, for example, to output the news flash to the television set 902 at the direction of the client application 925 responsible for displaying news items.

Because a variety of different operating systems 922 may be utilized by a variety of different brands and types of set-top boxes, a middleware layer 924 may be provided to allow a given software application to be executed by a variety of different operating systems. According to an embodiment, the middleware layer 924 may include a set of application programming interfaces (APIs) that are exposed to client applications 925 and operating systems 922 that allow the client applications to communicate with the operating systems through common data calls understood via the API set. As described below, a corresponding middleware layer is included on the server side of the CATV system 900 for facilitating communication between the server-side application server and the client-side set-top box 904. The middleware layer 942 of the server-side application server and the middleware layer 924 of the client-side set-top box 904 may format data passed between the client side and server side according to the Extensible Markup Language (XML).

According to one embodiment, the set-top box 904 passes digital and analog video and data signaling to the television set 902 via a one-way communication transport 934. According to other embodiments, two-way communication transports may be utilized, for example, via high definition multimedia (HDMI) ports. The set-top box 904 may receive video and data from the server side of the CATV system 900 via the HFC network 915 through a video/data downlink and data via a data downlink. The set-top box 904 may transmit data from the client side of the CATV system 900 to the server side of the CATV system 900 via the HFC network 915 via one data uplink. The video/data downlink is an in-band downlink that allows for digital and analog video and data signaling from the server side of the CATV system 900 through the HFC network 915 to the set-top box 904 for use by the set-top box 904 and for distribution to the television set 902. The in-band signaling space operates in a specified frequency range that is generally divided into channels. Each channel may carry one or more signals, for example, a single analog signal or multiple digital signals.

The data downlink and the data uplink between the HFC network 915 and the set-top box 904 comprise out-of-band data links. The out-of-band frequency range is generally lower than the frequency range used for in-band signaling. Data flow between the client-side set-top box 904 and the server-side application server 940 is typically passed through the out-of-band data links. Alternatively, an in-band data carousel may be positioned in an in-band channel into which a data feed may be processed from the server-side application server 940 through the HFC network 915 to the client-side set-top box 904. Operation of data transport between components of the CATV system 900 is well known to those skilled in the art.

The headend 910 of the CATV system 900 is positioned on the server side of the CATV system and includes hardware and software systems responsible for originating and managing content for distributing through the HFC network 915 to client-side set-top boxes 904 for presentation to customers via television set 902. As described above, a number of services may be provided by the CATV system 900, including digital and analog video programming, interactive television services, telephone services, video-on-demand services, targeted advertising, and provision of information content.

The application server 940 is a computing system operative to assemble and manage data sent to and received from the client-side set-top box 904 via the HFC network 915. As described above with reference to the set-top box 904, the application server 940 includes a middleware layer 942 for processing and preparing data from the headend of the CATV system 900 for receipt and use by the client-side set-top box 904. For example, the application server 940 via the middleware layer 942 may obtain data, such as content metadata, from third-party services 946 via the Internet 944 for transmitting to a customer through the HFC network 915 and the set-top box 904. When the application server 940 receives the downloaded content metadata, the middleware layer 942 may be utilized to format the content metadata for receipt and use by the set-top box 904. Therefore, content metadata may be sent and categorized based on the availability to the customer's program guide data.

According to one embodiment, data obtained and managed by the middleware layer 942 of the application server 940 is formatted according to the Extensible Markup Language and is passed to the set-top box 904 through the HFC network 915 where the XML-formatted data may be utilized by a client application 925 in concert with the middleware layer 924, as described above. As should be appreciated by those skilled in the art, a variety of third-party services data, including news data, weather data, sports data and other information content may be obtained by the application server 940 via distributed computing environments such as the Internet 944 for provision to customers via the HFC network 915 and the set-top box 904. According to embodiments, client application 925 may include the client application 224 described herein.

According to embodiments, the application server 940 obtains customer support services data, including billing data, information on customer work order status, answers to frequently asked questions, services provider contact information, and the like from data services for provision to the customer via an interactive television session. In the illustrated embodiment, the services provider data services include a number of services operated by the services provider of the CATV system 900 which may include data on a given customer.

A billing system 962 may include information such as a customer's name, street address, business identification number, Social Security number, credit history, and information regarding services and products subscribed to by the customer. According to embodiments, the billing system 962 may also include billing data for services and products subscribed to by the customer for bill processing, billing presentment, and payment receipt.

A customer information database 968 may include general information about customers such as place of employment, business address, business telephone number, and demographic information such as age, gender, educational level, and the like. The customer information database 968 may also include information on pending work orders for services or products ordered by the customer. The customer information database 968 may also include general customer information such as answers to frequently asked customer questions and contact information for various service provider offices/departments. As should be understood, this information may be stored in a variety of disparate databases operated by the cable services provider.

A web services system 950 serves as a collection point for data requested from the various data services systems. According to embodiments, when the application server 940 requires customer services data from one or more of the data services, the application server 940 passes a data query to the web services system 950. The web services system formulates a data query to each of the available data services systems for obtaining any required data for a requesting customer as identified by a set-top box identification associated with the customer. The web services system 950 serves as an abstraction layer between the various data services systems and the application server 940. That is, the application server 940 is not required to communicate with the disparate data services systems, nor is the application server 940 required to understand the data structures or data types utilized by the disparate data services systems. The web services system 950 is operative to communicate with each of the disparate data services systems for obtaining necessary customer data. The customer data obtained by the web services system is assembled and is returned to the application server 940 for ultimate processing via the middleware layer 942, as described above.

An authentication system 966 may include information such as secure user names, subscriber profiles, subscriber IDs, and passwords utilized by customers for access to network services. As should be understood by those skilled in the art, the disparate systems 950, 962, 966, 968 may be integrated or provided in any combination of separate systems, of which the illustrated embodiment is only one example.

Figure 10:
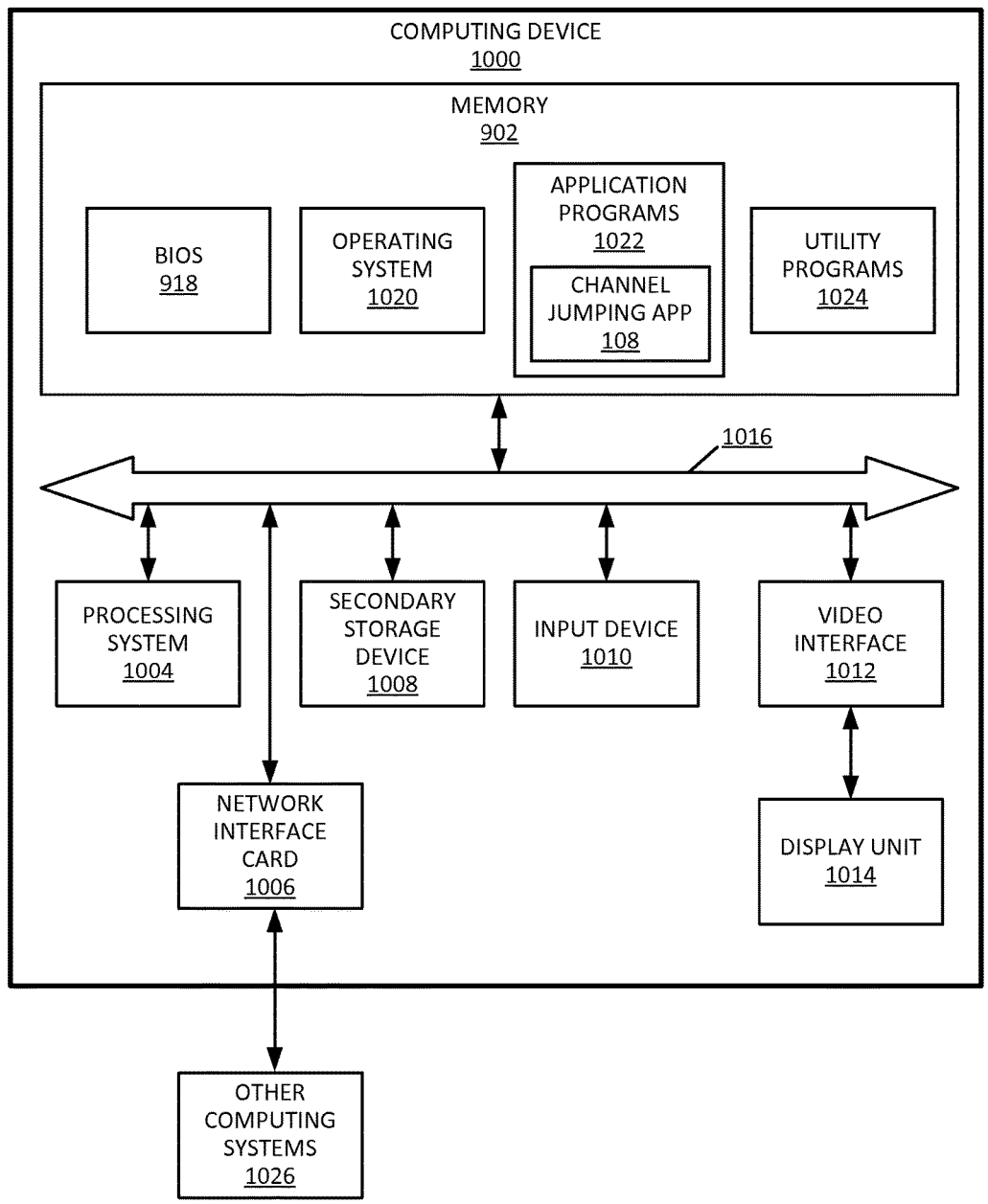
FIG. 10 is a simplified block diagram illustrating example physical components of a computing device with which embodiments of the system may be practiced.

FIG. 10 is a simplified block diagram illustrating example physical components of a computing device 1000 with which embodiments of the system 200 may be practiced. In some embodiments, one or more of the components of system 200 may be implemented using one or more computing devices like the computing device 1000. It should be appreciated that in other embodiments, components of system 200 may be implemented using computing devices having hardware components other than those illustrated in the illustrated embodiment.

Computing devices may be implemented in different ways in different embodiments. For instance, in the illustrated embodiment, the computing device 1000 includes a processing system 1004, memory 1002, a network interface 1006, a secondary storage device 1008, an input device 1010, a video interface 1012, a display unit 1014, and a communication medium 1016. In other embodiments, the computing device 1000 may be implemented using more or fewer hardware components (e.g., a video interface, a display unit, or an input device) or in combination with other types of computer systems and program modules 1026.

The processing system 1004 includes one or more processing units, which may include tangible integrated circuits that selectively execute computer-executable instructions. In various embodiments, the processing units in the processing system 1004 are implemented in various ways. For example, the processing units in the processing system 1004 can be implemented as one or more processing cores. In another example, the processing system 1004 can comprise one or more separate microprocessors. In yet another example embodiment, the processing system 1004 can comprise Application-Specific Integrated Circuits (ASICs) that provide specific functionality. In yet another example, the processing system 1004 provides specific functionality by using an ASIC and by executing computer-executable instructions.

Memory 1002 and secondary storage device 1008 may store computer-readable information, such as, but not limited to, computer-executable instructions (e.g., programs), data structures, and/or data. The processing system 1004 may perform an I/O operation to retrieve the computer-readable information from the secondary storage device 1008. According to one embodiment, any of the applications of the system 200 may be may be stored locally on computing device 1000. Thus, memory 1002 and/or secondary storage device 1008 may store the computer-executable instructions that, when executed by processor 1004, cause the system 200 to provide channel block switching as described above.

In various embodiments, memory 1002 and secondary storage device 1008 may be implemented as various types of computer-readable storage media. Computer-readable storage media broadly encompasses removable and non-removable devices, media, and other articles of manufacture, which may be implemented in various methods or technologies, providing for volatile or nonvolatile storage and retrieval of computer-readable information. As used herein, computer-readable media includes computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), magnetic disks, magnetic tape drives, CD-ROM discs, DVD-ROM discs, and Blu-Ray discs.

The computing device 1000 may be enabled to send data to and receive data from a communication network via a network interface card 1006. In different embodiments, the network interface card 1006 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The input device 1010 enables the computing device 1000 to receive input from a user. Example types of input devices include, but are not limited to, keyboards, mice, trackballs, stylus input devices, keypads, microphones, joysticks, touch-sensitive display screens, and other types of devices that provide user input to the computing device 1000.

The video interface 1012 outputs video information to the display unit 1014. In different embodiments, the video interface 1012 is implemented in different ways. For example, the video interface 1012 is a video expansion card. In another example, the video interface 1012 is integrated into a motherboard of the computing device 1000. In various embodiments, the display unit 1014 can be a an LCD display panel, a touch-sensitive display panel, an LED screen, a projector, a cathode-ray tube display, or another type of display unit. In various embodiments, the video interface 1012 communicates with the display unit 1014 in various ways. For example, the video interface 1012 can communicate with the display unit 1014 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 1016 facilitates communication among the hardware components of the computing device 1000. In different embodiments, the communications medium 1016 facilitates communication among different components of the computing device 1000. For instance, in the illustrated embodiment, the communications medium 1016 facilitates communication among the memory 1002, the processing system 1004, the network interface card 1006, the secondary storage device 1008, the input device 1010, and the video interface 1012. In different embodiments, the communications medium 1016 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The memory 1002 stores various types of data and/or software instructions. For instance, in the illustrated embodiment, the memory 1002 stores a Basic Input/Output System (BIOS) 1018, and an operating system 1020. The BIOS 1018 includes a set of software instructions that, when executed by the processing system 1004, cause the computing device 1000 to boot up. The operating system 1020 includes a set of software instructions that, when executed by the processing system 1004, cause the computing device 1000 to provide an operating system that coordinates the activities and sharing of resources of the computing device 1000. The memory 1002 also stores one or more application programs 1022 that, when executed by the processing system 1004, cause the computing device 1000 to provide applications to users. The memory 1002 also stores one or more utility programs 1024 that, when executed by the processing system 1004, cause the computing device 1000 to provide utilities to other software programs.

Embodiments of the present invention may be utilized in various distributed computing environments where tasks are performed by remote processing devices that are linked through a communications network in a distributed computing environment.

Figures 11A, 11B:
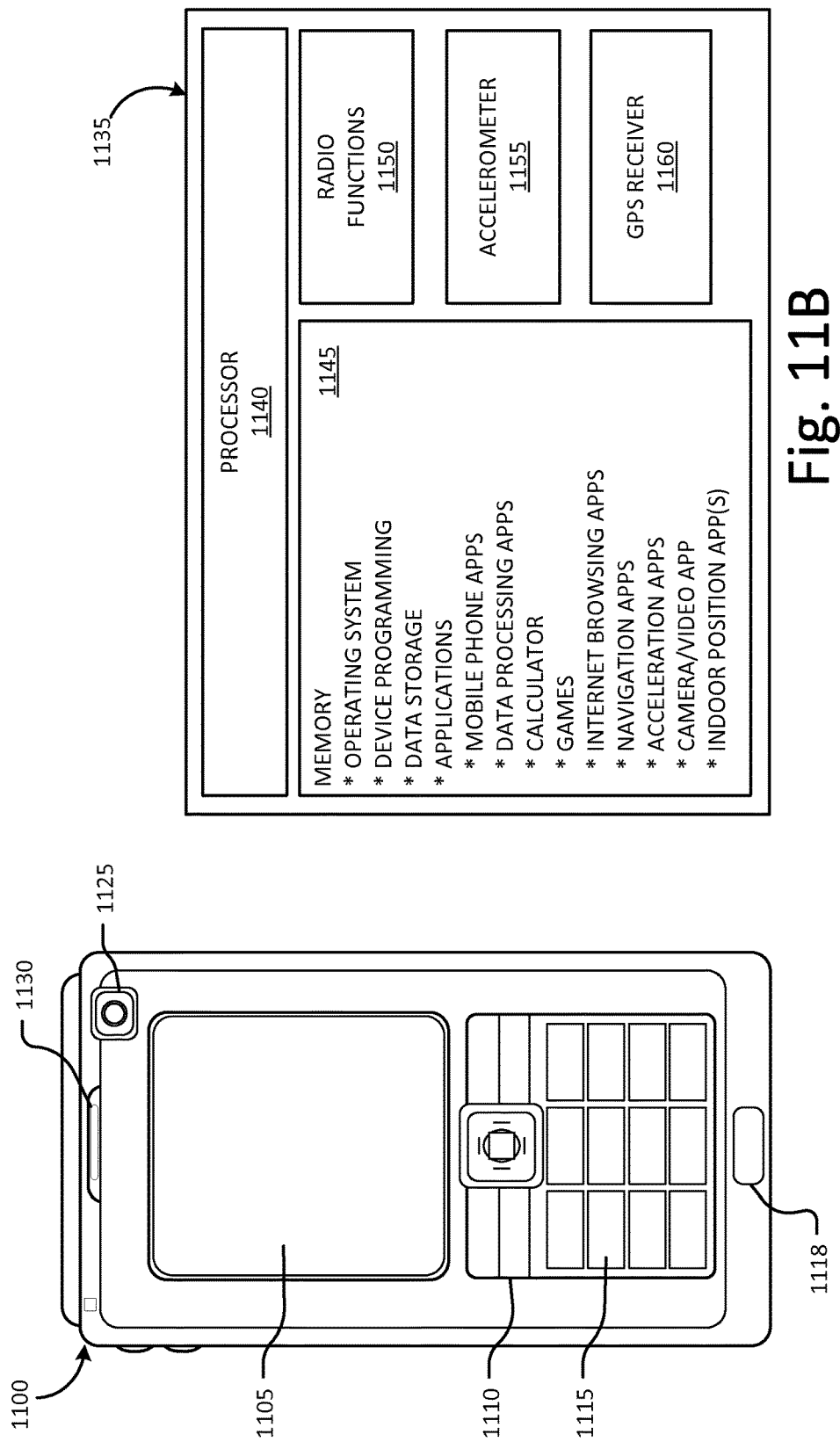
FIGS. 11A and 11B illustrate a suitable mobile computing environment with which embodiments of the system may be practiced.

FIGS. 11A and 11B illustrate a suitable mobile computing environment, for example, a mobile computing device, a smart phone, a laptop computer, a tablet personal computer, and the like, with which embodiments may be practiced. The mobile computing device 1100 is illustrative of any suitable device operative to send, receive, and process wireless communications according to embodiments of the present invention. A display screen 1105 is operative for displaying a variety of information such as information about incoming and outgoing communications, as well as, a variety of data and displayable objects, for example, text, alphanumeric data, photographs, and the like.

Data input to the device 1100 may be performed via a variety of suitable means, such as, touch screen input via the display screen 1105, keyboard or keypad input via a data entry area 1110, key input via one or more selectable buttons or controls 1115, voice input via a microphone 1118 disposed on the device 1100, photographic input via a camera 1125 functionality associated with the mobile computing device, or any other suitable input means. Data may be output via the device 1100 via any suitable output means, including but not limited to, display on the display screen 1105, audible output via an associated speaker 1130 or connected earphone system, vibration module for providing tactile output, and the like.

Referring now to FIG. 11B, operational unit 1135 is illustrative of internal operating functionality of the mobile computing device 1100. A processor 1140 is illustrative of a general purpose computer processor for processing incoming and outgoing data and communications and controlling operation of the device and associated software applications via a mobile computing device operating system. Memory 1145 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the client application 224 may be stored locally on mobile computing device 1100.

Mobile computing device 1100 may contain an accelerometer 1155 for detecting acceleration, and can be used to sense orientation, vibration, and/or shock. Mobile computing device 1100 may contain a global positioning system (GPS) system (e.g., GPS send/receive functionality) 1160. A GPS system 1160 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 1150 include all required functionality, including onboard antennae, for allowing the device 1100 to communicate with other communication devices and systems via a wireless network. Radio functions 1150 may be utilized to communicate with a wireless or a WI-FI positioning system to determine the location of a device 1100.

Although described herein in combination with mobile computing device 1100, in alternative embodiments the invention may be used in combination with any number of computer systems, such as in desktop environments, laptop or notebook computer systems, multiprocessor systems, microprocessor-based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to flowcharts and/or operational illustrations of methods, systems, and computer program products according to embodiments. The functions/acts noted in the blocks may occur out of the order as shown in any flowchart or described herein with reference to the Figures. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method comprising:
    generating a channel block profile for a channel block that includes a plurality of channels and corresponding cells, wherein the channel block profile includes a first resolution and a first bit rate;
    generating a viewing profile that includes a second resolution and a second bit rate for a plurality of linear channels associated with the channel block, wherein the channel block profile controls display of the channel block according to the first resolution and the first bit rate and the viewing profile controls display of an individual linear channel selected from the plurality of linear channels associated with the channel block according to the second resolution and the second bit rate, wherein each of the second resolution and the second bit rate of the viewing profile are higher than or equal to each of the first resolution and the first bit rate of the channel block profile;
    generating a channel block sequence description for the channel block including a number of channels to display in the channel block, an order of the channels to display in the channel block, an order of the channel block relative to one or more other channel blocks, and sequencing information for moving between the one or more other channel blocks and any individual channels defined by the channel block sequence description;
    providing a channel block user interface (UI) that includes:
        first and second channel block switching controls that enable control of movement from one channel block to a next channel block or prior channel block; and
        a cycling control that enables switching between sampling channels using a channel block view or channel view;
    requesting a channel block manifest based on the channel block profile and viewing profile, wherein each channel block manifest includes a compilation of individual channel manifests that correspond to each channel in the channel block;
    parsing a section of the channel block manifest for each individual channel manifest to display programming of each channel included in the channel block;
    using a configuration service to host one or more default channel block sequence descriptions configured by a service provider and one or more shared channel block sequence descriptions authored by one or more other viewers;
    displaying the channel block according to the channel block sequence description;
    in response to use of one of the first and second channel block switching controls, displaying the next channel block or prior channel block; and
    in response to use of the cycling control, displaying either the channel block view or channel view.

2. The method of claim 1, further comprising:
    receiving a selection of one of the cells; and
    rendering audio from a linear channel displayed in a selected cell.

3. The method of claim 2, further comprising:
    receiving a commitment of the selected cell; and
    switching to a single channel display showing a corresponding viewing profile for the linear channel associated with the selected cell.

4. The method of claim 2, further comprising muting audio from linear channels displayed in cells other than the selected cell.

5. The method of claim 2, further comprising displaying closed captioning for linear channels displayed in cells other than the selected cell.

6. The method of claim 1, further comprising configuring a channel block sequence containing a plurality of channel blocks according to the channel block sequence description, and receiving a switching command to switch between the plurality of channel blocks via swiping gestures on a touch screen of a remote control device.

7. The method of claim 6, further comprising:
    associating a first group of channels with cells in a first channel block;
    associating a second group of channels with cells in a second channel block;
    displaying each channel associated with the first channel block in a corresponding cell;
    switching from the first channel block to the second channel block; and
    displaying each channel associated with the second channel block in a corresponding cell.

8. The method of claim 6, further comprising individually displaying channels not assigned to a channel block in the channel block sequence.

9. The method of claim 1, further comprising:
    configuring the channel block with a selected number of cells; and
    associating a linear channel with each cell in the channel block.

10. The method of claim 9, further comprising:
    adding a plurality of channel blocks to a channel block sequence; and
    setting a navigation order of the channel blocks within the channel block sequence.

11. A system comprising:
    a transcoder that:
    generates at least one channel block profile for a channel block that includes a plurality of channels and corresponding cells, wherein the channel block profile includes a first resolution and a first bit rate; and
    generates at least one viewing profile that includes a second resolution and a second bit rate for programming associated with each of a plurality of linear channels of the channel block, wherein the channel block profile controls display of the channel block according to the first resolution and the first bit rate and the viewing profile controls display of an individual linear channel selected from the plurality of linear channels associated with the channel block according to the second resolution and the second bit rate, wherein each of the second resolution and the second bit rate of the viewing profile are higher than or equal to each of the first resolution and the first bit rate of the channel block profile;

a content cache in communication with the transcoder, the content cache to store channel block profiles and viewing profiles;

a packager to generate channel block manifests based on each channel block profile and each viewing profile, wherein each channel block manifest includes a compilation of individual channel manifests;

a channel block user interface (UI) that includes:
   first and second channel block switching controls that enable control of movement from one channel block to a next channel block or prior channel block; and
   a cycling control that enables switching between sampling channels using a channel block view or channel view;

a first display device in communication with the content cache and operable to display the channel block UI that displays the channel block to simultaneously display the programming for each channel of the channel block, wherein the first display device displays the first and second channel block switching controls, and the cycling control;

a client application in communication with the first display device and operable to use a channel block sequence description for the channel block that includes a number of channels to display in the channel block, an order of the channels to display in the channel block, an order of the channel block relative to one or more other channel blocks, and sequencing information for moving between the one or more other channel blocks and any individual channels defined by the channel block sequence description, wherein the client application receives command inputs via one or more of the first and second channel block switching controls to move from one channel block to the next channel block or prior channel block and/or the cycling control to switch between sampling channels using the channel block view or channel view; and a configuration service in communication with the client application and operable to host one or more default channel block sequence descriptions configured by a service provider and one or more shared channel block sequence descriptions authored by other viewers, the client application to parse a section of the channel block manifest for each individual channel manifest to display programming of each channel included in the channel block.

12. The system of claim 11, wherein the configuration service operates to store a configuration for a plurality of channel blocks and provide the configuration for a current channel block to the first display device, the configuration specifying a channel associated with each cell in the channel block.

13. The system of claim 11, the packager operable to segment the channel block profiles and the viewing profiles into a plurality of chunks and to generate the channel block manifests associating the chunks with the corresponding channel block profiles and viewing profiles for each channel substantially continuously as channel block profiles are generated.

14. The system of claim 11, further comprising a manifest service, wherein the manifest service operates to store each channel block manifest and each individual channel manifest and to provide each channel block manifest to the client application.

15. The system of claim 11, further comprising a second display device controlled via the first display device, wherein the system utilizes the channel block profile to conserve bandwidth.

16. The system of claim 11, wherein the first display device is a mobile computing device and a second display device comprises a television.

17. The system of claim 13, wherein the first display device is further operable to request the chunks from the channel block profile associated with each cell in a current channel block and to simultaneously display the chunks in a corresponding cell.

18. A non-transitory computer readable medium containing computer executable instructions which, when executed, perform a method comprising:
   generating a channel block profile for a channel block having a plurality of channels and a plurality of cells, wherein the channel block profile includes a first resolution and a first bit rate;
   generating a viewing profile that includes a second resolution and a second bit rate for a plurality of linear channels associated with the channel block, wherein the channel block profile controls display of the channel block according to the first resolution and the first bit rate and the viewing profile controls display of an individual linear channel selected from the plurality of linear channels associated with the channel block according to the second resolution and the second bit rate, wherein each of the second resolution and the second bit rate of the viewing profile are higher than or equal to each of the first resolution and the first bit rate of the channel block profile;
   generating a channel block sequence description for the channel block including a number of the plurality of channels to display in the channel block, an order of the plurality of channels to display in the channel block, an order of the channel block relative to one or more other channel blocks, and sequencing information for moving between the one or more other channel blocks and any individual channels defined by the channel block sequence description;
   providing a channel block user interface (UI) that includes:
      first and second channel block switching controls that enable control of movement from one channel block to a next channel block or prior channel block; and
      a cycling control that enables switching between sampling channels using a channel block view or channel view;
   requesting a channel block manifest based on the channel block profile and viewing profile, wherein each channel block manifest includes a compilation of individual channel manifests that correspond to each channel in the channel blocks;
   configuring a channel block sequence according to the channel block sequence description;
   parsing a section of the channel block manifest for each individual channel manifest programming of each channel included in the channel block;
   using a configuration service to host one or more default channel block sequence descriptions configured by a service provider and one or more shared channel block sequence descriptions authored by one or more other viewers;

displaying an associated channel in each cell of the channel block using the channel block profile;

receiving a selection of one of the cells of the channel block;

rendering audio from a channel displayed in the selected cell;

muting the audio from channels displayed in cells other than the selected cell;

in response to use of one of the first and second channel block switching controls, displaying the next channel block or prior channel block; and in response to use of the cycling control, displaying either the channel block view or channel view.

19. The non-transitory computer readable medium of claim 18 wherein the method further comprises:

receiving a switching command to switch between a plurality of channel blocks via swiping gestures on a touch screen of a remote control device;

receiving a commitment of the selected cell via the remote control device; and switching to a single channel display showing a linear channel feed displayed in the selected cell.

20. The non-transitory computer readable medium of claim 18, wherein the method further comprises using swiping gestures as part of switching to a different channel block according to the channel block sequence.

\* \* \* \* \*